J. H. CONNELLY.
EXTINGUISHING FIRES IN OIL TANKS.

No. 181,413.  Patented Aug. 22, 1876.

Witnesses:  Inventor

UNITED STATES PATENT OFFICE.

JOSEPH H. CONNELLY, OF NEW BRIGHTON, ASSIGNOR TO JAMES L. HASTINGS AND WILLIAM H. HASTINGS, OF PITTSBURG, PENNSYLVANIA.

IMPROVEMENT IN EXTINGUISHING FIRES IN OIL-TANKS.

Specification forming part of Letters Patent No. 181,413, dated August 22, 1876; application filed June 27, 1876.

*To all whom it may concern:*

Be it known that I, JOSEPH H. CONNELLY, of New Brighton, county of Beaver, and State of Pennsylvania, have invented a new and useful Improvement for Extinguishing Fires in Oil-Tanks; and I do hereby declare the following to be a full, clear, and concise description thereof, reference being had to the accompanying drawings.

The object of my invention is to deliver carbonic-acid gas inside of an oil-tank or an oil-agitator, for the purpose of extinguishing fire; and I also show the manner by which my apparatus may be applied to an oil-tank when the same contains oil, equally as well as when the tank is empty.

The gas is made in the usual manner, and stored in receivers ready for use, as previously described in Letters Patent heretofore granted to me.

Figure 1:
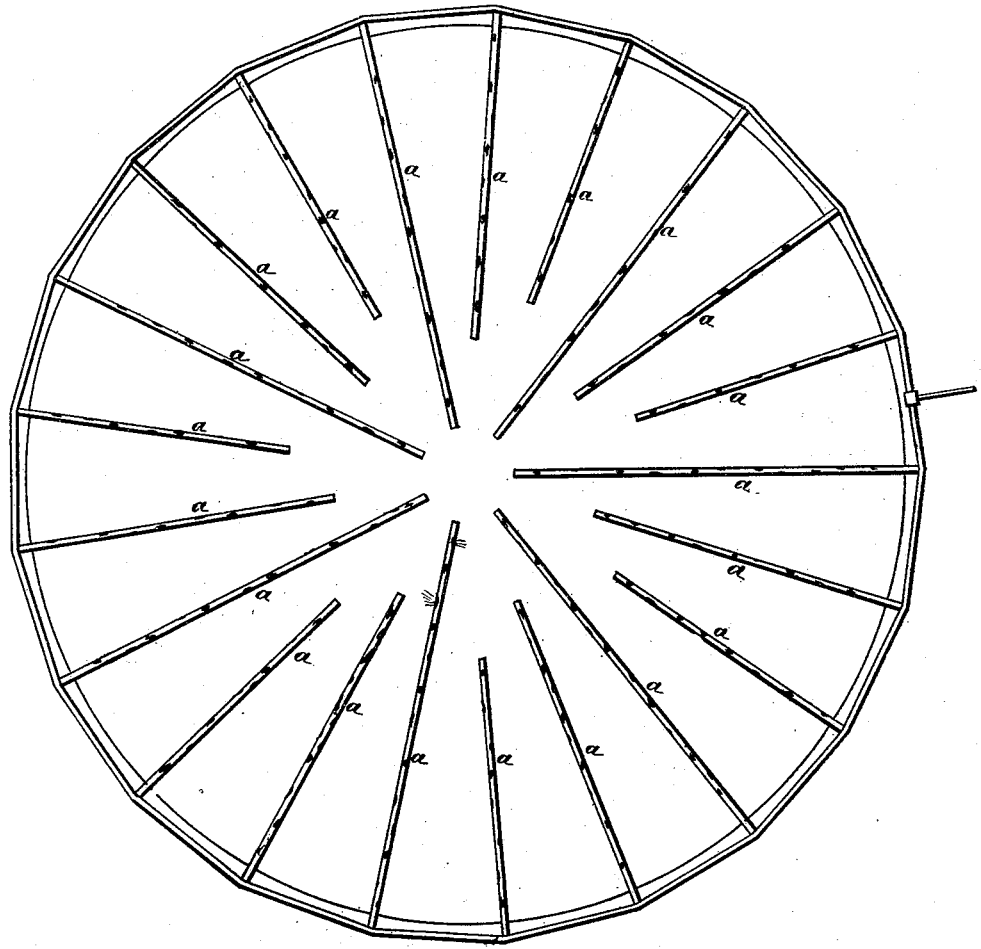

Figure 1 represents an apparatus for delivering gas on the bottom of a tank.

a a a, &c., represent pipes put through the sides of the tank, and lying on or near the bottom, and communicating with an outside pipe running around the tank. The radial pipes inside the tank are perforated to allow the gas to pass out into the oil when it rises to the surface, diffusing itself entirely over it, and the fire is thus extinguished. The perforations may be turned downward, or in any way to be most effectual in diffusing the gas.

Figure 3:
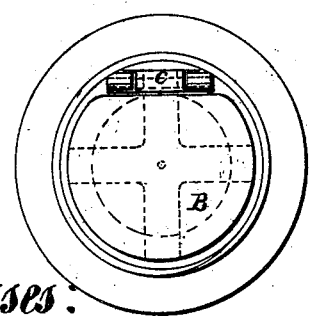
Figure 2:
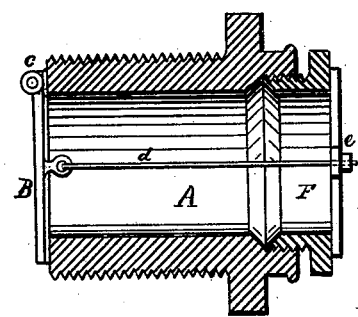

The method of putting these radial pipes into the tank while it contains oil is as follows: A, in Fig. 2, represents a bushing having the thread cut around the outside. B, Fig. 3, shows a valve on the inner end, which hinges at *c*. *d* is a rod, which holds the valve B more securely in its place, while the bushing is being screwed in by means of a nut and clamp, *e*. The hole is first drilled by means of a combined drill and tap, the tap following the drill. After the tap and drill are withdrawn, the bushing is screwed in, which prevents the escape of oil. The nut and clamp and rod may then be removed, and the pipe to be inserted, already perforated and provided with a suitable valve on the outer end, is pushed into the bushing. The end of the pipe opens the valve of the bushing, and when the pipe is pushed into its place, it is wound with any suitable packing, and the packing-nut F screwed up, which prevents any leakage around the pipes.

I claim as my invention—

1. In combination, the tank, the perforated radial pipes extending within it through a suitable bushing, and the main distributing-pipe for the extinguishing agent, placed outside of said tank, and connecting with the radials.

2. In an oil-tank bushing, the main portion A, having flap-valve B, adapted to be held closed by the longitudinal rod and cross-bar, in combination with the packing-nut F.

In testimony whereof I have subscribed my name in presence of two witnesses.

JOSEPH H. CONNELLY.

Witnesses:
 J. H. TAYLOR,
 CHAS. E. BROOKS.